(12) United States Patent
Favetta et al.

(10) Patent No.: US 10,121,563 B2
(45) Date of Patent: Nov. 6, 2018

(54) SYSTEMS AND METHODS FOR PRODUCING BIOCHAR-BASED PRODUCTS

(71) Applicants: Dino Favetta, Cedar Knoll, NJ (US); Dirk-Jan Rosse, Millbrook, NY (US); James C. Slattery, Staten Island, NY (US)

(72) Inventors: Dino Favetta, Cedar Knoll, NJ (US); Dirk-Jan Rosse, Millbrook, NY (US); James C. Slattery, Staten Island, NY (US)

(*) Notice: Subject to any disclaimer, the term of this patent is extended or adjusted under 35 U.S.C. 154(b) by 0 days.

(21) Appl. No.: 15/334,165

(22) Filed: Oct. 25, 2016

(65) Prior Publication Data

US 2017/0040083 A1 Feb. 9, 2017

Related U.S. Application Data

(63) Continuation of application No. 13/648,828, filed on Oct. 10, 2012, now Pat. No. 9,478,324.

(60) Provisional application No. 61/545,229, filed on Oct. 10, 2011.

(51) Int. Cl.

| | |
|---|---|
| *H01B 1/04* | (2006.01) |
| *C10L 5/44* | (2006.01) |
| *H01G 11/86* | (2013.01) |
| *H01M 4/04* | (2006.01) |
| *H01M 4/583* | (2010.01) |
| *C01B 32/05* | (2017.01) |

(52) U.S. Cl.
CPC ............ *H01B 1/04* (2013.01); *C01B 32/05* (2017.08); *C10L 5/44* (2013.01); *H01G 11/86* (2013.01); *H01M 4/0471* (2013.01); *H01M 4/0483* (2013.01); *H01M 4/583* (2013.01)

(58) Field of Classification Search
CPC ...................................................... H01B 1/04
See application file for complete search history.

(56) References Cited

U.S. PATENT DOCUMENTS

| | | | |
|---|---|---|---|
| 2,319,952 | A | 5/1943 | Schorger |
| 4,552,863 | A | 11/1985 | Fujimori |
| 6,051,096 | A | 4/2000 | Nagle et al. |
| 2011/0172092 | A1 | 7/2011 | Lee et al. |

OTHER PUBLICATIONS

U.S. Appl. No. 13/648,828, filed Oct. 10, 2012, U.S. Pat. No. 9,478,324.

*Primary Examiner* — Larry W Thrower
(74) *Attorney, Agent, or Firm* — McCarter & English, LLP (57) ABSTRACT

An end-to-end system/process for producing advantageous end products from a raw biomass feedstock is provided. The process includes steps for enhancing biomaterial feedstock, biochar generation and end-product fabrication. The method steps may be employed in selecting, treating and handling biomass materials and their additive inputs to tailor their end performance. Each operative step in the process may be employed to enhance the overall effectiveness of biochar generation and use. Charring furnace design and operational parameters are provided that generate desirable biochar material for various applications, including specifically fabrication of ultra-capacitor electrodes and electric battery components.

9 Claims, 4 Drawing Sheets

SYSTEMS AND METHODS FOR PRODUCING BIOCHAR-BASED PRODUCTS

CROSS-REFERENCE TO RELATED APPLICATION

The present application claims priority benefit to a co-pending non-provisional patent application entitled "Systems and Methods for Producing Biochar-Based Products," which was filed on Oct. 10, 2012, and assigned Ser. No. 13/648,828, which in turn claims priority to a provisional application entitled "Systems and Methods for Producing Biochar-Based Products," which was filed on Oct. 10, 2011, and assigned Ser. No. 61/545,229. The entire content of the foregoing provisional patent application is incorporated herein by reference.

BACKGROUND

1. Technical Field

The present disclosure is directed to advantageous systems and methods for utilizing biochar as a feedstock to produce desirable end products. More particularly, the present disclosure provides systems/methods for producing and selecting plant species, cultivating, harvesting, handling and treating of the biomass of those plant species, and producing biochar from said biomass with desired properties, processing such biochar according to advantageous processing conditions/parameters, and forming desired end products from the processed biochar, e.g., using "net shape" technology. Among the desirable end products that may be produced according to the disclosed systems/methods are ultra-capacitor electrodes, electric battery electrodes and electric battery electrode support materials and the like.

2. Background Art

The ability to store electric energy in large amounts gives rise to great benefit when coupled to electric energy generated by renewable methods. However, the storage of large amounts of electricity presents major hurdles of cost, storage product or system total life-cycle, power density and energy density. Batteries can be used to store electric energy in chemical reaction-based systems. Capacitors can store electric energy in electrically charged plates. Each type of device (battery or capacitor) has advantages or disadvantages of energy density versus power density, total number of charge/discharge cycles, speed of charge/discharge cycles and sophistication of materials of construction. Disposal of the materials of construction associated with the foregoing devices is also a consideration in their selection and use.

Although standard capacitors and electrolytic capacitors are commonplace, they are generally not effective to economically store electric energy for large-scale use. Ultra-capacitors utilize additional components and principles of operation that allow electric energy to be stored in their dual-electrode design, thereby making them more competitive in the large scale, electric energy storage marketplace. Existing ultra-capacitor electrodes are made from graphite, graphene, graphene-oxide or other forms of activated carbon. Likewise, battery electrode support material is commonly made from similar carbon compounds.

Current problems with graphite, graphene, graphene-oxide include availability, toxicity and the monotonic nature of the materials. While the monotonic limitations associated with these materials can be marginally enhanced or modified with some compounding, the materials are still generally limited to hexagonal planar carbon structures.

Among the objectives of the present disclosure are new venues and uses of biochar materials to address fundamental material needs. The objectives of the present disclosure are satisfied in part by novel fabrication processes that allow the material inputs to respond to the fabrication process, thereby making a product that can be "tuned" and tailored to its use, e.g., as an ultra-capacitor electrode element or battery electrode support material. A further objective is to provide systems and methods that are based on processes and inputs that are "green" and renewable, including their entire life-cycle. Still further, an objective of the present disclosure is to utilize process inputs that are grown and harvested, not mined as is the case with current materials such as graphite. An additional objective of the present disclosure is to utilize process inputs that are predominantly collected from nature, not produced in a laboratory as is the case with many competing input compounds that are highly toxic, such as graphene and graphene-oxide.

SUMMARY

The present disclosure sets forth an end-to-end system/process for producing advantageous end products from a Raw Biomass feedstock. The present disclosure further provides advantageous techniques and processes for individual steps encompassed within the disclosed end-to-end system/process. Thus, the present disclosure may be viewed as an integrated whole, i.e., a process that embodies each of the processing steps from feedstock to end product, and/or as individual steps associated with biochar generation and use that are highly beneficial as freestanding improvements. Consistent with the modular and integrated nature of the present disclosure, each of the component steps/aspects is discussed below. However, it is to be understood that integration of the component steps/aspects of the present disclosure may be employed to yield particularly advantageous results.

The present disclosure further describes methods for treating and handling biomass materials and their additive inputs to further tailor their end performance by optionally performing upstream conversion of treating, machining, extruding, pressing and then subjecting them to further thermal and chemical processing in a furnace to produce a biochar of varied controlled properties to then be used in fabricating ultra-capacitor electrodes and electric battery components.

Additional features, functions and benefits of the disclosed systems and methods will be apparent from the detailed description which follows, particularly when read in conjunction with the accompanying figures.

BRIEF DESCRIPTION OF THE FIGURES

To assist those of skill in the art in making and using the systems and method of the present disclosure, reference is made to the appended figures, wherein.

DESCRIPTION OF EXEMPLARY EMBODIMENT(S)

For purposes of the present disclosure, the following terms will have the following definitions:

Raw Biomass: Any material of biological source, preferentially, but not limited to clean, harvestable plants, yeasts, fungi or molds of controllable alkali metal content (such as potassium, such as sodium, and other naturally occurring plant minerals and alkali metals) in said plants, yeasts or molds also or additionally containing high isoprene content including but not limited to grasses such as goldenrod, such as bamboo, such as aster, such as rose, such as Timothy Grass) and said Raw Biomass plant species optionally containing other poly-isoprene compounds such as terpenes, including but not limited to oak, such as white oak, such as red oak, and other wood species or components such as pine, such as pine cones, such as pine needles, and plant fruit by-products such as skins or seeds from white grapes such as Muscat, such as Gewurztraminer, such as Riesling, such as Muller-Thurgau, and other varietals knows to be "fragrant", "floral", or "spicy", to the human senses, those commonly human-sensed qualities originating from poly-isoprene related terpene compounds such as but not limited to mono-terpenes through sesquiterpenes, said isoprene-based and terpene-based compounds having polymeric and molecular bonding effects in the produced end product and affecting the properties of the end product.

Processed Biomass: Raw Biomass that has been treated or otherwise processed, e.g., by laying fallow for retting, collecting, bailing, bundling, aging, pressing, or any other mechanical transformation, for purposes of then further optional processing, including heating, toasting/torrefaction, cooling, freezing, freeze-drying, leaching, washing, retting, fermenting, soaking, treating, infusing or other thermal or mass transport operations to change, add or remove components, chemical compounds, moisture, salts, minerals or other items within/to/from the Raw Biomass thereby transforming the Raw Biomass into Processed Biomass. The noted treatment/processing is generally intended, and for certain end-use applications of the final biochar product it is specifically intended to affect and control the results of downstream process operations that use the Processed Biomass, e.g., as an input to produce desired end products (e.g., ultra-capacitor and electric battery parts and/or components).

Prepared Biomass: Processed Biomass that has been treated or otherwise processed, e.g., by pressing, cutting, milling, grinding, pulverizing or any other mechanical transformation, thereby transforming the Processed Biomass into Prepared Biomass for purposes of then further processing, including extruding or pelletizing the Prepared Biomass. The noted treatment/processing is generally intended, and for certain end-use applications of the final biochar product it is specifically intended to affect and control the results of downstream process operations that use the Prepared Biomass, e.g., as an input to produce desired end products (e.g., ultra-capacitor and electric battery parts and/or components).

Converted Biomass/Biomaterial (including pre-shaping): The material that results from the process of processing/machining of Prepared Biomass into a converted form, e.g., densification and pre-shape forming, said densification and pre-shape forming occurring as a result of any of several steps including pressing, pelletizing, stamping, stamping of pelletized material, extruding, extruding of pelletized material and/or quasi-homogenizing into a transformed biomaterial. The resulting interim product of this conversion step being a pre-shaped biomaterial close to final shape or form of the necessary electrode in the shape of a chip, wafer, cylinder, disk or any other necessary shape suitable as input to the subsequent charring process step to be performed to then result in the production of the raw biochar net-shaped product. According to the present disclosure, a key aspect of this conversion involves interaction of the Prepared Biomass with natural and/or input chemical compounds that transform the Prepared Biomass into Converted Biomass. The conversion and transformation of the Prepared Biomass to form Converted Biomass generally involves collapsing of the biomass plant material cell wall and biomass material into smaller voids and chambers, and the release (or "activating" reactions) of chemically bound plant isoprene, poly-isoprene, terpenes (mono-terpenes through sesquiterpenes), lignin, phenolics, poly-phenolics, hemi-cellulose and cellulose or their byproducts, in an oily or waxy form, that causes and/or aids in the fusing of the other plant matter in its pressed and or worked and heated state to result in the new physical, mechanical and chemical properties of the final Converted Biomass.

Raw Biochar: The product of heated transformation of the Converted Biomass or transformed biomaterial, e.g., by means of pressing, heating, retorting, steam or gas reforming, torrefaction, toasting, microwaving, induction heating, partially combusting, baking or other thermal heat and energy input means so as to reduce the Converted Biomass or pre-shaped or transformed biomaterial into Raw Biochar having resultant specific mechanical, chemical and most importantly, electrical properties. The Pre-Shaped Converted Biomass being processed in said heat treatment chamber or oven for charring into desired Raw Biochar during the heat treating and charring process in a laid flat position, vertical position or in a "press" between plates such as flat plates, such as curved plates, such as spiral plates, such as helical plates, or other shapes, conforming to the desired net-shaping of the resulting Raw Biochar.

Prepared Biochar: The biochar that is produced when the Raw Biochar is further treated and handled (after conversion from biomass to biochar) so as to make it more suitable for production of desired end product(s), e.g., for use as ultra-capacitor or electric battery fabrication inputs. These treatments to the Raw Biochar, thereby making it Prepared Biochar, may include coating, soaking, drying, infusing by natural or forced diffusion of other inputs using means of application such as direct pressure, such as ambient environment pressure, such as vacuum followed by introduction of additive input followed by re-pressurization, or any such means to implant the input compound(s) on the surface or within the matrix of void volume of the raw biochar thereby resulting in the creation of the Prepared Biochar. Said treated Raw Biochar then optionally having been infused can be subject to further reacting, aging or treating for additional changes in properties, e.g., for the purpose of adding chemical compounds, ions, elements, or other materials, and/or for the purpose of controlling or changing the properties of the original Raw Biochar, such as pore size, such as pore accessibility, such as bulk adhesion, such as electron or ion transport rate control when in use, such as electron or ion affinity control when in use, or such as modification of any other mechanical or electrochemical property of the final Prepared Biochar.

Net-Shaping: A processing method wherein Converted Biomass is pre-shaped to a dimensional form such that any subsequent changes that occur to it (such as shrinkage, such as swelling, such as curvature, etc.) in the transformation to Raw Biochar or to Prepared Biochar are pre-calculated, expected, and anticipated, and the resulting Prepared Biochar item, such as a wafer, such as chip, such as a cylinder is in its final or near-final shape or form to be used in the manufacture of a desired end product, e.g., an ultra-capacitor electrode or electric battery component.

Net-Shaped Biochar Electrodes: Ultra-capacitor electrodes that are formed during their processing into their final or near final shape for use as electrodes, e.g., ultra-capacitor electrodes or electric battery electrode or electric battery electrode support material, possibly requiring some physical trimming by mechanical means such as smoothing of surfaces or edges, such as smoothing or grinding of surfaces or edges, and said mechanical finishing being performed by friction such as a physical contact machine such as a grinder, such as a drill, such as a milling machine, such as a fluid stream jet, such as a water jet, such as an air jet, or by non-contact energy such as a LASER for physical mechanical changes such as cutting, such as etching, such as edge preparation for final implementation as an ultra-capacitor electrode or an electric battery component or an electric battery electrode or an electric battery electrode support material.

Ultra-Capacitor Application: An exemplary use of an ultra-capacitor as an energy storing device for direct current (DC) or filtering of alternating current (AC) electricity.

As noted above, the present disclosure provides an end-to-end system/process for producing advantageous end products from a Raw Biomass feedstock. The present disclosure further provides advantageous techniques and processes for individual steps encompassed within the disclosed end-to-end system/process. In addition, the present disclosure provides methods for treating and handling biomass materials and their additive inputs to further tailor their end performance by optionally performing upstream conversion of treating, machining, extruding, pressing and then subjecting them to further thermal and chemical processing in a furnace to produce a biochar of varied controlled properties to then be used in fabricating ultra-capacitor electrodes and electric battery components.

Figure 1:
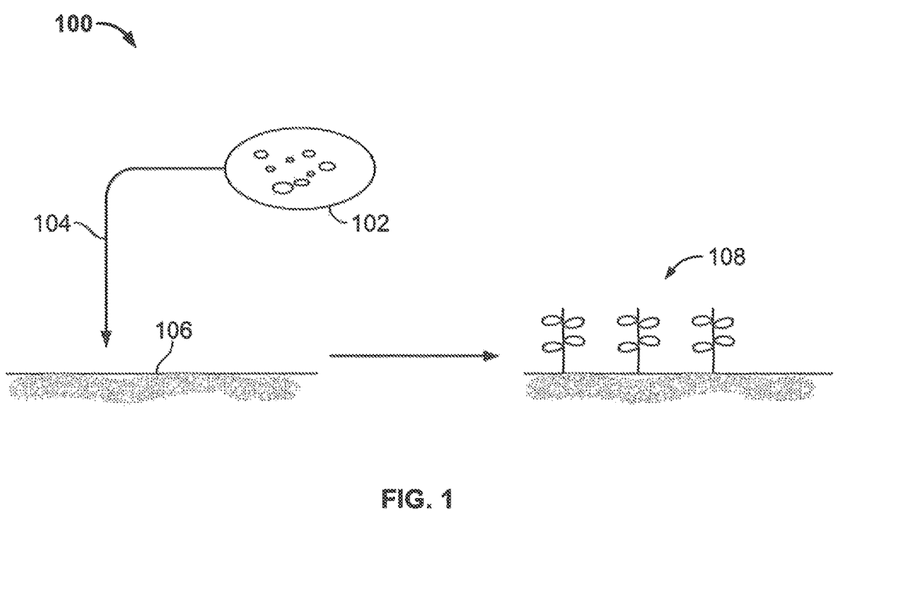
FIG. 1 is a schematic flow chart setting forth an exemplary raw biomass supply chain model.

By way of initial overview, reference is made to the appended figures. With initial reference to FIG. 1, a schematic flow chart setting forth an exemplary raw biomass supply chain model is provided. In the disclosed process 100, plant seeds, seedlings or sprouts 102 form the starting point. Plant seed, seedling or sprout selection is generally based on species and genus for plant organic content and cell structure, suitability to selected applicable soils, and downstream processing of preparation, conversion and charring for use in ultra-capacitor electrodes, battery component and the like. Through appropriate treatment 104, e.g., application, irrigation, fertilization, inputs, spacing and orientation of the plants, desirable feedstock can be generated for biochar generation. Of note, site selection 106 influences the characteristics and suitability of the plant output. Site and soil selection criteria include drainage, soil and sub-soil chemistry, solar exposure, rain and manual irrigation profile, atmospheric condition profile and the like. As shown in FIG. 1, plant output 108 provides the feedstock for biochar generation. In exemplary embodiments of the present disclosure, a highly selective biomass crop for input to downstream processes to produce biochar is achieved, such biochar having widespread utility including in the production of ultra-capacitor electrodes and battery components.

Figure 2:
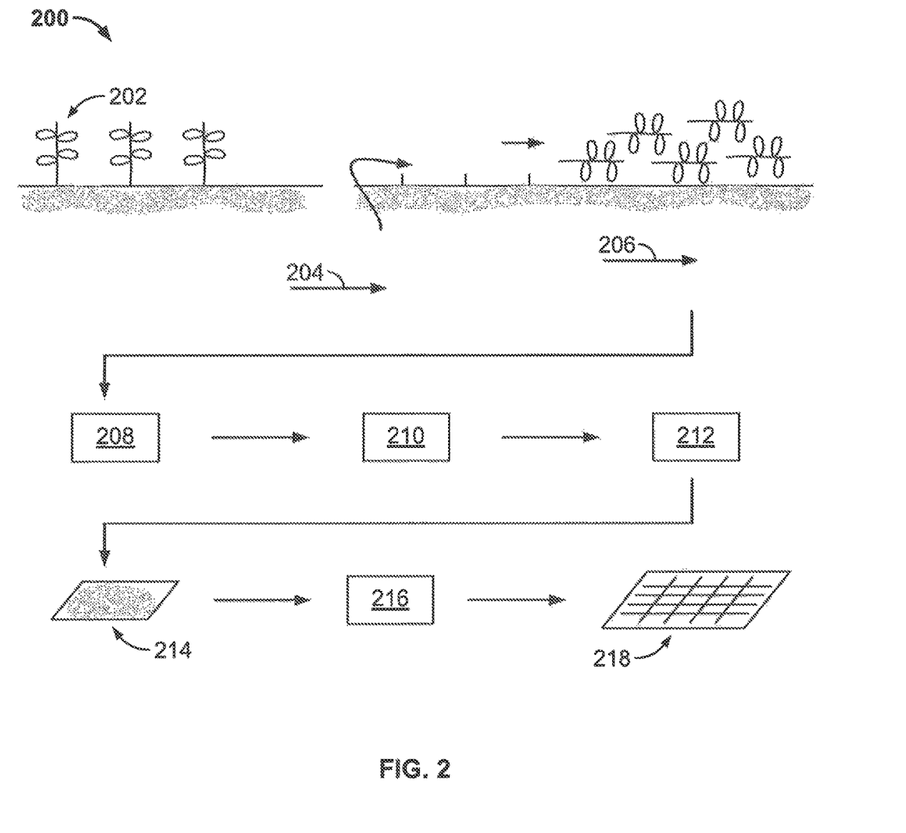
FIG. 2 is a schematic flow chart setting forth an exemplary raw biomass conversion to prepared biomass/biomaterial.

With reference to FIG. 2, a schematic flow chart setting forth an exemplary raw biomass conversion to prepared biomass/biomaterial is provided. In the disclosed process 200, a highly selective biomass crop 202 is employed as input to downstream processes to produce biochar as a compound for useful applications, e.g., ultra-capacitor electrodes and battery components. A cutting and harvesting step 204 is undertaken, preferably at precise time to achieve optimum selection for processing of the plant material to biochar, e.g., for ultra-capacitor or battery applications. The cut/harvested plant material may be allowed to lay fallow (step 206) for retting, natural extraction, and controlled chemical conversion. Thereafter, in step 208, the plant material is advantageously subjected to grinding and milling to set particle size and effect mechanical transformation. In step 210, an optional Extraction and/or infusion of solutions, ions and compounds may be undertaken. Thereafter, in step 212, densification, extrusion, heating, cooling, and net-shaping of the biomaterial into pre-formed and pre-processed elements may be undertaken. FIG. 2 schematically depicts the pre-net shaped element 214 of biomass/biomaterial prior to final optional treatment and charring into biochar. Thereafter, in step 216, element 214 may be subjected to optional post-shaping treatment, heating, torrefaction, cooling, infusion and/or extraction, thereby generating pre-net-shaped element 218 of biomass/biomaterial that is fully treated and prepared for charring process and conversion, e.g., to ultra-capacitor electrode, battery component or the like.

Figure 3:
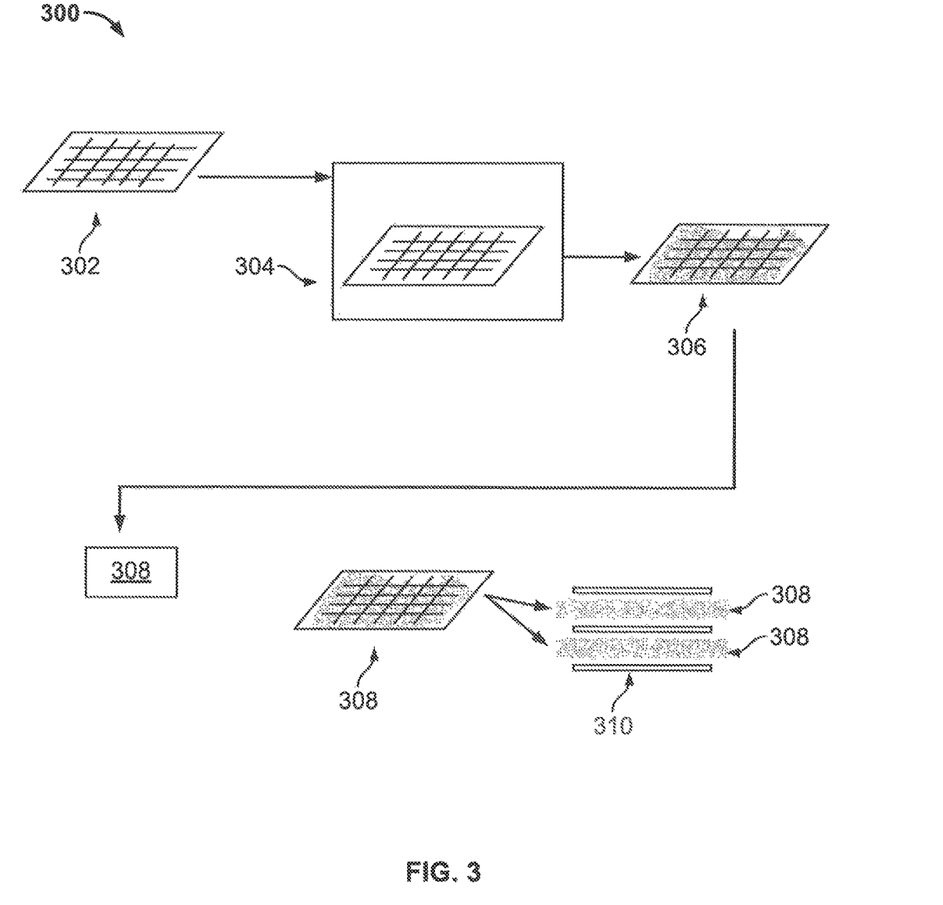
FIG. 3 is a schematic flow chart setting forth an exemplary biomass/biomaterial conversion and charring into net-shaped ultra-capacitor electrodes.

With reference to FIG. 3, a schematic flow chart setting forth an exemplary biomass/biomaterial conversion and charring into net-shaped ultra-capacitor electrodes is provided. The process 300 commences with pre-net-shaped element(s) 302 of biomass/biomaterial that is fully treated and prepared for charring process and conversion, e.g., to ultra-capacitor electrode, battery component or the like. Charring oven 304 is typically provided with purge/environment control functionality, off-gas analysis for biochar process control, and a source of heat (e.g., electric heat, external gas heat, inductive heating, microwave heating, and/or heating of purge/environment gas). The output from the charring oven 304 is/are unfinished net-shaped biochar electrode wafer(s) 306. The wafer(s) 306 may undergo an optional post-charring infusion, extraction or treatment step 308 for control of final physical and electrical properties. Process 300 yields finished net-shaped and active biochar element(s) for use in various applications, e.g., as ultra-capacitor electrodes, battery components and the like. FIG. 3 illustrates exemplary net-shaped biochar electrodes in a final product, i.e., in ultra-capacitor 310.

Building on the overview provided by the flow charts of FIGS. 1-3, the present disclosure describes various processing steps associated with exemplary implementations of the disclosed biochar production—and associated equipment/instrumentation—hereinbelow. As will be apparent to persons skilled in the art, the processing steps may be implemented in whole or in part to achieve advantageous and desired results.

Biomass Production: An advantageous system and method for biomass production is disclosed which involves, inter alia, preparing and converting Raw Biomass to produce Converted Biomass/Biomaterial with specific and controllable properties resulting in predictable properties when transformed to biochar.

More particularly, according to the present disclosure, advantageous techniques have been developed that relate to the selection of plant species, selection of soils and environment (growing conditions), planting and growing (with selected inputs) of the selected species, and harvesting of selected species, such that the resulting Raw Biomass is ideally and uniquely suited as an upstream process input to the manufacture of desired end products, e.g., Net-Shaped Biochar Electrodes made from the biochar. In addition, the disclosed techniques include the handling of Raw Biomass into Prepared Biomass wherein the Raw Biomass is mechanically and chemically altered by processes to prepare it for final conversion into a Converted Biomass/Biomaterial.

The growing and selection of plant species, soils and environment required is undertaken according to the present disclosure so as to produce Raw Biomass that has controlled isoprene content, terpene content, mineral content, phenolic content, poly-phenolic content, oligomer content, lignin content and oils and waxes that are utilized in the downstream conversion from Prepared Biomass to Converted Biomass/Biomaterial. The mineral content of the Raw Biomass plays several key roles in downstream operations according to the present disclosure. Specifically, during the charring process that transforms Converted Biomass/Biomaterial into biochar, the alkali metals respond to the external source of heat in the charring oven with limited presence of oxygen (torrefaction, pyrolysis and charring) with said alkali metal thereby entering the ionic vapor state (e.g., potassium transitions to K+ ion vapor at approximately 350° C.) and perform the role of a free-radical and chemical reaction initiator, breaking cellulose and lignin molecular chains and molecular rings, allowing further reactions to take place for chemical bonding and creation of pores and chambers within the Prepared Biomass to convert the Prepared Biomass as it becomes Raw Biochar. The size, number, length, diameter and cross-channeling of the pores and chambers of the resulting Raw Biochar are affected by the concentration of such free-radical ions of the alkali metals, thereby affecting the performance of the biochar in desired end products/applications, e.g., to adsorb and hold electrical ions and electrons in various but controlled ways.

The isoprene, poly-isoprene, terpenes (mono-terpenes through sesquiterpenes), lignin, phenolic compounds, poly-phenolic compounds, oligomers, hemi-cellulose, the natural plant oils or infused oils and waxy compounds, i.e., the "glues", of the Raw Biomass and Prepared Biomass play a key role in the production of the Converted Biomass/Biomaterial. Moreover, the glues provide utility in applications that include a net-shaping process and also in the final performance of Prepared Biochar, e.g., prior to final input to an ultra-capacitor application. These glue compounds in the Raw Biomass and Prepared Biomass are activated by the heat/machining/work of the Raw Biomass to Prepared Biomass conversion process, such as pressing or extrusion, and advantageously function to take the pressed and densified net-shaped biomass/biomaterial and allow it to hold its shape, both during the charring process when forming the Raw Biochar and during the infusion or further treatment of said Raw Biochar to Prepared Biochar (such as aqueous salt introduction into the Biochar pores by soaking the net-shaped biochar). This "glue function" of the compounds present in the Biomass, when combined with control of the "Time, Temperature, Pressure, and Environment" of the conversion process (the charring process), make the assembled part a "greener" entity by not using synthetic, teratogenic or toxic additive or input compounds.

Exemplary Plant Species Selection:

Exemplary plant species used to produce the Biomass according to the present disclosure include: Golden Rod (*Soliago* sp.), Timothy Grass (*Galium Pratense*), Sedges (*Cyperus Esculentus*), Low Profile Rose (*Rosa Multiflora*), Purple Aster (*Symphyotrichum Puniceum*). Other common cool season perennial grasses and common weeds may be mixed in provided they offer a source of desired compounds or benefit to interim processes or end-products. Additionally to cool season grasses, other high isoprene content grasses such as Bamboo (*Bambusa Vulgaris*) may also be used or added to the Source Biomass mix. The nature of these biomass feedstock plants are such that they exhibit waxy smooth stem and stalk, usually indicative of the presence of certain preferential chemical components. The use of the leaves or roots of these plants may be incorporated, but with limited and restrained use since these leaves or roots also contain higher concentrations of chemical compounds and elements that have been found to be detrimental to the efficacy of the end-product and in the interim steps in the process when applying the art.

In generating the desired biomass, a focus on the plant stems is generally advantageous because the stems have the most starches, cellulose fibers, lignins and isoprene-based polymers, all of which can play a key role in downstream processes to make the end product. By way of contrast, there are concentrations of minerals in leaves, roots and seeds which are generally detrimental, such as silica, potassium, sodium, phosphates, NPK, sulfates, and chlorides. These minerals can negatively affect the charring process and block cross-linked bonding of the preferred chemical compounds for mechanical stability of the char. In addition, the electrical properties of the end product may be negatively impacted by the foregoing minerals.

Exemplary Soil Selection for Biomass Growth:

Biomass crop fields according to the present disclosure are advantageously selected by soil type and past usage. Soils that are nutritionally weak for plant growth are desired due to that soil's low mineral content. Fields which have been heavily cultivated in the past with heavy soil fertilization and pesticide use are not suitable for control of biomass and end product electric energy storage device properties, and therefore such soils should not be used, unless extreme and severe downstream processing of the biomass preparation is acceptable to the processor to remove these contaminants in downstream steps at significant cost and possibly significant economic disadvantage. Preferentially, no additives of nitrate-phosphates-potassium (NPK) fertilizers are required in the growth of the input biomass crop, although limited amounts could be added to the soil in quantities that can be managed as residual components in the interim downstream steps of processing and their removal or planned management in the biomass. The soils that are best suited for this selected production of the biomass are a low clay, low silica soil, such as found in Dutchess County, New York. Exemplary soil types for advantageous use in producing desired crops include Cardigan, Dutchess and Nassau soil types and other soils of similar low clay and low silica content.

Exemplary Harvest, Laying Fallow, Collecting, Treating and Storing (Aging) of Raw Biomass Harvest of the plant to collect the Raw Biomass is preferentially done after the growth cycle of the plant is complete and becoming dormant. This plant growth completion state allows for a portion of the plant's prior mineral uptake to be returned to the soil by natural processes while the plant and stem is still attached to the root. Harvesting prior to a complete growth cycle can be utilized; however, high mineral and alkali metal content remains in the harvested plant material leading to the disadvantages of further need to process the biomass in downstream steps to avoid affecting the end product biochar. After initial cutting of the plants with a conventional harvesting device, such as cycle bar mower or other common cutting methods, the crop is optionally left on the ground to further leach out soluble minerals, such as chlorides (Cl−), potassium (K+), sodium (Na+), iron (Fe++, FE+++ and iron complexes), aluminum (Al+++ and aluminum complexes), phosphates (POx), sulfates (SOx), etc. Exemplary periods that crops may be left on the ground include periods of up to two weeks, e.g., one or more days, thereby allowing for natural exposure to and washing by morning dew. Periods of greater than two weeks (i.e., 14 days) have been found to be an approximate limit beyond which detrimental decomposition of the biomass begins.

The biomass may lay fallow in the growth field, after cutting, so as to experience natural rain. It has been found that exposure of the cut biomass to several inches of rain (with amounts on the order of six inches of rain being optimal) facilitate the washing, extraction and leaching of soluble mineral compounds from the biomass. Further exposure of the cut biomass to natural dew and/or rain beyond rain in the six inch range has been found to be of little to no additional benefit in washing, extraction and leaching of soluble mineral compounds from the biomass.

For industrial purposes the biomass may alternately be immediately collected after cutting and force-washed by manual means, such as spray washing/drying or soaking/drying. The manual washing is also generally effective to remove the soluble minerals; however, using liquid solvents such as water, steam, acetone, acetic acid and the like, may be advantageous. In exemplary embodiments, the liquid solvent(s) is/are selected so as to permit the liquid or liquid blends to be returned to the soil so as to return the extracted soluble mineral nutrients and the liquid back to nature for ecological and economic purposes.

The dried biomass crop is generally then baled into round or rectangular bales, although other bale shapes may be employed. Baling of the dried biomass crop is generally undertaken by conventional means and the baled biomass is then moved to a storage area, preferentially off of natural ground contact on a barrier. Exemplary barriers include one or more concrete slabs, wood pallets and well drained tarps. The barriers advantageously function to avoid or minimize decomposition, rot and losses of some of the biomass that can result if the biomass is stored in direct soil contact. Of note, the barrier-stored bale may experience further leaching of mineral nutrients, e.g., in the outdoor open air for various storage periods, e.g., storage periods of one or more months to extended periods, e.g., multiple years. Storage periods that exceed thirty six (36) months have shown no further useful benefit to aging/leaching of the bale.

Thus, various steps are advantageously taken to reduce the mineral content of the biomass. In exemplary embodiments of the present disclosure, mineral content is reduced to a level such that mineral ash generated when a sample of the biomass is burned is reduced to a level that is below about 4% by weight. In preferred implementations, mineral ash levels are reduced to levels below about 1.6% to 3.0% by weight. The mineral ash generated by burning of the biomass may be measured by conventional means, such as by burning a sample of the biomass and measuring the resultant mineral ash, or by other reliable sampling and measuring methods.

Conversion/Pelletization of Processed Biomass into Prepared Biomass and then Pre-Shaped Biomaterial:

Once the Raw Biomass has been processed to low mineral and ash content as described above, the Raw Biomass may now be considered Processed Biomass. According to the present disclosure, the Processed Biomass may now be processed into final Prepared Biomass for input into the pre-shaping mechanical (extrusion/pelletization) step. Typically, preparation steps include size reduction of the Processed Biomass. In exemplary embodiments, the size and form of the Processed Biomass is converted to fine particles, e.g., in three stages. To input the Processed Biomass into the size reduction steps/stages, the biomass is generally at a total moisture level of less than 8% by weight, and preferably 4% by weight or less. In certain embodiments, the moisture content of the biomass may be reduced to a substantially bone dry condition, i.e., approaching 0% moisture by weight.

In exemplary embodiments, the Processed Biomass bale is initially cut into bunches of biomass of about six inch sections. This disassembly and chopping of the bale of Processed Biomass is a gross step and allows the biomass to be passed into a typical second milling step. In a typical second step, the chopped Processed Biomass is then passed through a one inch hammer mill for finer cutting/grinding into particles of about ¼" to ⅛" in length and overall longest dimension. In a typical third and final step, grinding is undertaken in a small hammer mill, thereby further reducing the pieces of chopped Processed Biomass to a saw-dust-like or "fluff" material with maximum of ⅛ inch in any dimension.

The use of a fine hammer mill or similar apparatus is necessary to maximize surface area and open the fibers of the Processed Biomass to a "fluffy" fibrous consistency to facilitate both fiber mechanical crosslinking as well as chemical bonding crosslinking in the subsequent pelletizing and pre-shaping step. Indeed, by achieving a fine "dust" and "fluff" in the fine hammer mill step, the fibers are broken so far down in size that it helps the chemical bonding reactions in the hot extrusion/pelletizing process. These smaller particle sizes expose enough surface area such that the chemical reactions to fuse the pellet or pre-shaped end-product are kinetically driven rather than a mere surface reaction on the surface of each particle if they were larger.

This finely ground and machined Processed Biomass is now considered Prepared Biomass for direct feed into the mechanical conversion extruder/pelletizer for final pre-shaping. Thus, the ground mix "fluff" and "dust" of the Prepared Biomass is generally force fed into the extruder/pelletizer via an auger. Inside the extruder/pelletizer, the Prepared Biomass is extruded into ⅛ inch to ¼ inch diameter pellets of controllable length or pre-shaped end-products, the diameter or shape cross-sectional profile being determined by the die plate design. In this pelletizing and pre-shaping step, a conversion by rapid heat transfer in the pelletizer/extruder occurs, thus allowing cellulose, starches, lignins, phenolics, oligomers, and isoprene-based components in the biomass fibers to melt, to be reformed and to react while being shaped into a high density pellet or pre-shaped into the near-intended pre shape of the end biochar product. No actual charring occurs in the extrusion/pelletizing pre-shaping step, although some torrefaction and "cooking" of the biomass may be allowed to take place. The time, temperature, shear and pressure conditions of the extrusion/pelletizing step are generally selected so as to both collapse the plant cell walls down to smaller chambers and smaller volumes while simultaneously creating heat from frictional work onto the biomass, thereby releasing the biomass residual moisture as steam and thereby subjecting the starches, cellulose, lignins, phenolics, oligomers and isoprene and terpenes to chemically react and cross-link and bond the densified biomass into a permanent pre-shape wafer or pellet.

The extruded converted biomass is now in the form of an interim shaped pellet or a pre-shaped bio-material (depending on the die used). A typical knifing mechanism may be employed at the outlet of the die to establish individual wafers/pellets. Pressures in the die are generally above 50,000 psi and may be as high as 100,000 psi or more, and such extreme pressures are required to achieve the desired effects. In an exemplary embodiment, the die is 3" thick, with about a 5" diameter difference between the inner and outer diameter, and an overall 22" outer diameter. It is critical and necessary that extreme pressures build up in the die plate and within the die bores. The die has an operational temperature of not less than 220° F. but not more than 400° F. Of note, the lower end of the foregoing temperature spectrum is the coolest temperature point for the release of water from the biomass as steam, and the upper end of the temperature spectrum is roughly the point where excessive "cooking" of the biomass may occur, thereby permanently altering the biomass properties beyond that which is useful and therefore beyond that which supports the disclosed objectives.

In exemplary embodiments of the present disclosure, the heat within the extruder is self-generated by friction and work upon the biomass being pressed through the die by mechanical means, and the die and exiting pellet or pre-shaped biomaterial is typically at 220° F. to 230° F. The heat generated by the die press operation is generally high enough to release the biomass moisture as steam from the die area of the extruder/pelletizer. By monitoring the amount of continually released steam, it is possible to control the proper work and heat input of the biomass in the extrusion and pelletization step. Control of steam emitted from the biomass in the extruder/pelletizer may be advantageously controlled in a feedback action, e.g., by addition of slight amount of water to the dry (4% moisture or less) "fluff" and "dust" Prepared Biomass at the feed auger to the extruder/pelletized so as to maintain a visible plume of steam exiting the extruder/pelletizer die section when operating. However, excessive addition of water to the Prepared Biomass at the extruder/pelletizer feed auger can be detrimental to the process when the biomass pellets or pre-shaped material exits the die as a soft and non-self-supporting material. In such circumstance, water addition to the Prepared Biomass at the extruder/pelletizer feed auger should be reduced so as to maintain a proper balance of the presence of steam at the extruder/pelletizer die exhaust while maintaining the production of firm and rigid extruded/pelletized or pre-shaped biomaterial that is self-supporting in the cutting section after the die.

The Prepared Biomass generally has a residence time in the die bore zone of 30 seconds or more when the die/feed roller rotation is at 60 to 90 rpm. Shorter residence times in the die and die bore caused by higher speed of the die rotation or die internal feed rollers results in loss of residence time and reduced fusing of the biomass and reduced biomass conversion resulting in lack of self-adhesion of the biomass material. These negative results can translate to failure of the pre-shaping operation or pelletization. The extruded/pelletized biomaterial pellets or pre-shaped biomaterial drop out of the bottom of the mill die area and into a collecting vessel or conveyor and are cooled with forced air to 80° F. before being stored or further processed into biochar.

Processing of Pellets or Pre-Shaped Biomaterial to Net-Shaped Biochar:

The biomaterial pellets formed in the extruder/pelletizer may optionally be stamped or pressed into a pre-shaped biomaterial in lieu of direct pre-shaped die extrusion. The pellet pressing step to press-form pre-shaped biomaterial is generally undertaken at pressures in excess of 50,000 psi so as to fuse the organic compounds in the biomaterial pellets into the pre-shaped near end-product form with minimal added void space in the resultant pre-shaped biomaterial.

Once the biomaterial is in its near-end-product pre-shaped form, either by direct pre-shaped extrusion or by pressing and forming of extruded pellets, the biomaterial may be placed in a furnace for charring and final conversion to a net-shaped or near-set-shaped biochar. In the charring step, extreme temperatures, typically in excess of 1800° F. and at times approaching 2500° F., are used to convert the biomaterial into biochar to achieve desired ending biochar properties. The time, temperature, atmosphere, and pressure of the charring process is critical in producing a biochar of desired physical, chemical and electrical properties according to the art. The resulting end properties of the biochar are directly affected by the component makeup of the biomaterial from prior steps, including but not limited to potassium ion content, and the time, temperature, atmosphere and pressure profile of the charring conditions within the furnace. Further, the pre-fused and bonded essential compounds in the biomaterial (lignins, phenolics, oligomers, isoprene, terpenes) may further chemically react, bond and cross-link in the charring process to affect the properties of the end-product biochar.

The design and operation of exemplary retort furnaces for use in treating the biomaterial to form a desired Net-Shaped Biochar according to the present disclosure generally involves the use of a sealed (or atmosphere-controlled) furnace, mostly devoid or purged of oxygen so as to inhibit the oxidation or ignition of the biomaterial and biochar while at elevated temperatures. The furnace must be heated to convert the contained biomaterial into the desired end-product Net-Shaped Biochar. Heating of the furnace may involve electrical heating, microwave heating, induction heating, hydrocarbon fuel heating and combinations thereof. Combinatorial heating methods may be employed that combine wood (firewood) with heat from furnace-resident biomaterial-generated off-gas. Although any heating method may be employed, particularly favorable results may be achieved using the high temperature self-regulating heating methods described herein.

Figure 4:
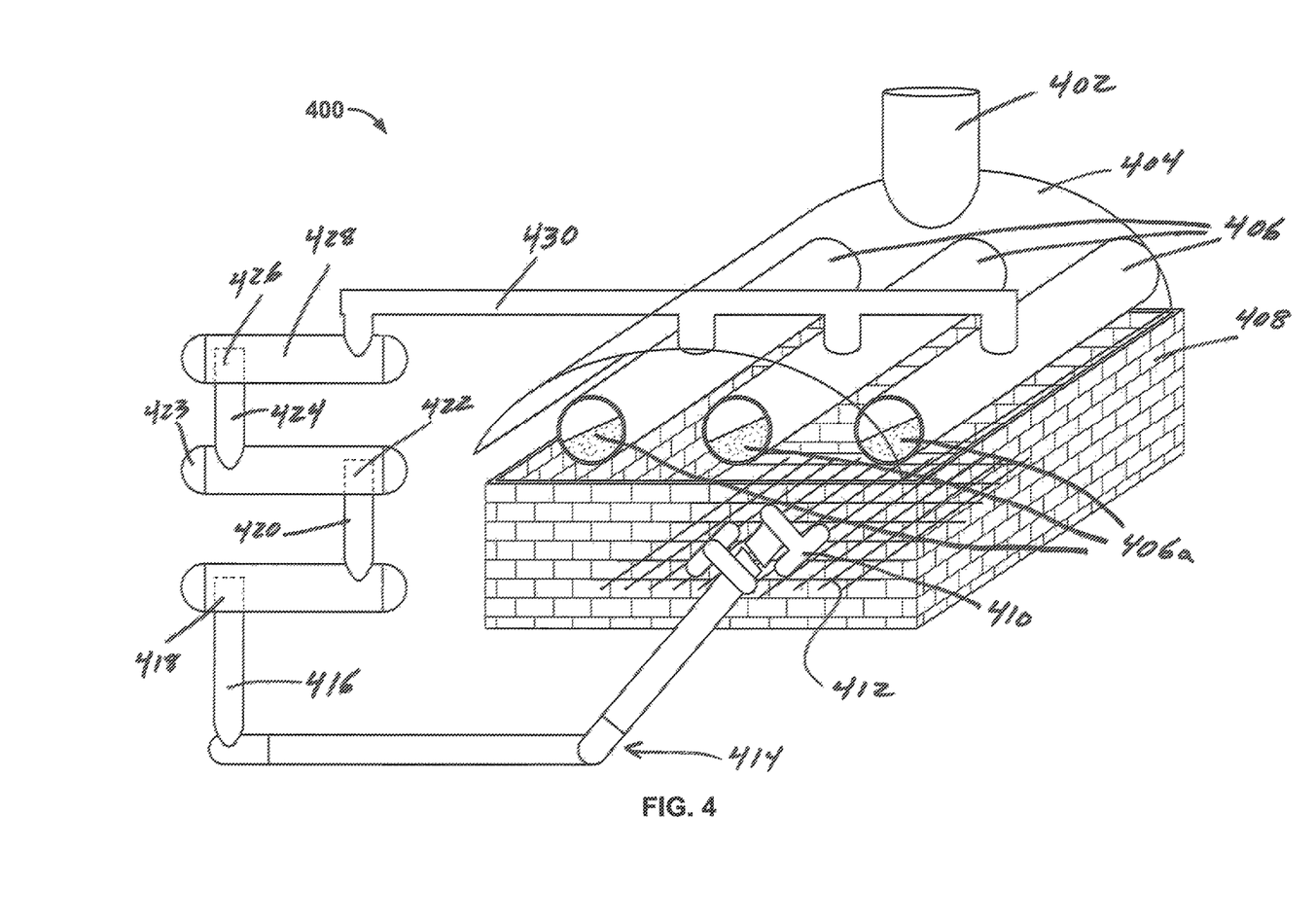
FIG. 4 is a schematic drawing of an exemplary furnace for use in producing biochar according to the present disclosure.

Exemplary retort furnace designs according to the present disclosure that may be used to convert biomaterial into satisfactory biochar utilize a furnace tube apparatus within a hearth and an off-gas collection and treatment system. An exemplary retort furnace 400 is depicted in FIG. 4. The furnace tube section contains the biomaterial for conversion to biochar and the biomaterial off-gas apparatus collects the off-gas (vapors) from the heated biomaterial, separates certain undesirable off-gas components, cools the biomaterial off-gas and then introduces the purified and cooled gas into the burner section of the hearth, thereby aiding in heating of the biomaterial and aiding in the production of the biochar. The combusted off-gas in the hearth is further aided by firewood to attain biochar temperatures in excess of 1800° F. and up to 2500° F. within the furnace tube.

Exemplary furnaces may use three (3) parallel furnace tubes laid side-by-side in a horizontally common plane. In exemplary implementations, the three furnace tubes are approximately 8 inches diameter and 8 feet in length separated by a space of about 4 inches. The furnace tubes are fabricated from high-tensile strength steel such as T1 grade steel with a tensile strength of approximately 100,000 psi. The furnace tubes that contain the biomaterial/biochar may be mounted over a supportive cement-block hearth on natural ground with the cement-block height being about 24 inches, thereby supporting the bottom of the furnace tubes. A steel grate to support the firewood is mounted about 4 inches above the ground within the hearth.

Each of the three furnace tubes typically has a single biomaterial off-gas sealed stack exhaust pipe of nominally 3 inches in diameter at the highest point of each horizontal tube. These three furnace off-gas pipes exit the hearth unit and then join into an insulated horizontal common biomaterial off-gas pipe header of 3 inches diameter and then connect downward to a series three-stage off-gas cooler/separator apparatus. The series off-gas cooler apparatus may be fabricated from stainless steel tubes 6 inches diameter and each being 4 feet long. The selection of stainless steel for the off-gas cooler tubes is preferred to reduce corrosion from off-gas compounds and is uninsulated so as to act as a set of three series air cooled heat exchangers/condensers of the various family of compounds of the heated biomaterial off-gas.

Each off-gas condenser in the series is generally angled slightly downward in the direction of off-gas flow so that the off-gas condensates can be collected and drained, but to avoid their entrainment into the next series cooler zone. The off-gases are taken from the top-side of each cooler downstream outlet to minimize entrainment to the next stage of the compounds that are condensed in the off-gas cooling stage. Likewise the final off-gas condenser is also slightly pitched so that the water and low-boiler compounds collect and do not carry into the off-gas final exit/exhaust pipe. The first of the series of off-gas coolers typically operates at an exterior surface temperature at the gas exit of that zone of 700° F. to 800° F. to condense off-gas tarry compounds. The second of the series of off-gas coolers operates at an exterior surface temperature at the gas exit of that zone of 400° F. to 500° F. to condense heavy molecular off-gas compounds and oxygenates. The third and last of the series of off-gas coolers operates at an exterior surface temperature at the gas exit of that zone of 80° F. to 100° F. to condense lighter hydrocarbons, and water off-gas compounds. This final off-gas cooler temperature is most critical because it eliminates inert water and water vapor from the cooled off-gases in the final stage off-gas exhaust pipe.

The final composition of the off-gas in the cooled off-gas exhaust pipe is mostly methane and hydrogen. This purified off-gas is then used as fuel to continue to heat the charring furnace tubes in a combined way with the firewood. The cooled off-gas exhaust pipe feeds the methane and hydrogen to a burner grate that sits buried in the glowing charcoals of the firewood that was originally used to on the grate of the hearth that started the biomaterial charring process that thereby produced the original off-gas. The off-gas methane and hydrogen is thereby pre-heated by being passed through the hot coals to a pre-combustion temperature of about 1200° F. (the typical temperature of red glowing firewood coals) and the pre-heated methane and hydrogen off-gas then exits the burner, passes through the glowing firewood coals, where it mixes with natural draft flue air entering the hearth near the base and combusts. The resulting temperature of the pre-heated off-gas then combusting reaches a final temperature of between 1800° F. to 2500° F., as measured with an infrared pyrometer at the bottom side of the furnace tubes containing the biomaterial that is being converted to biochar by the combined firewood combustion heat along with the collected and pre-heated off-gas combustion heat.

The method of placement and control of processing of the biomaterial in the furnace tubes, followed by the removal of the completed and converted biochar from the furnace tubes is significant to the disclosed system and process. Placement of the pre-shaped biomaterial must be such that there is adequate void spacing between the individual biomaterial items to allow for off-gas release and flow away from the biomaterial/biochar. Additionally, the depth of the biomaterial bed should be shallow enough so as not to inhibit the flow of conductive and convective heat from the bottom of the furnace tube, thereby allowing uniform heating of all of the biomaterial up through the biomaterial/biochar bed in the furnace tube during the charring process.

In exemplary embodiments of the present disclosure, the biomaterial is placed uniformly at the base of the furnace tube for its entire 8 foot length and placed to a depth of no more than 2 inches as measured at the tube's vertical centerline. The processing of the biomaterial into biochar is performed by sealing the furnace tubes, e.g., with end screw caps. The charring process is facilitated by placing firewood on the hearth grating so as to cover the grate and cover the off-gas burner jet assembly located in the hearth. The charring process is initiated by igniting the firewood to thereby begin heating the furnace tubes containing the biomaterial.

As the temperature within the furnace tubes begins to rise, the biomaterial releases volatile organic compounds (VOCs) and water vapor. These VOCs rise in the furnace tube and pass into each tube's off-gas pipe, join together in the common off-gas header as hot gas, and are partially condensed and cooled stage-wise in the series three-section air coolers. The dry cooled off-gas now reduced in heavy molecular weight VOC compounds then exits the coolers and is introduced into the hearth via a gas distribution grate buried within the burning coals of the firewood, wherein the off-gas is reheated to temperatures approaching that of the burning coals of the firewood and then ignites and combusts in air also introduced into the hearth. The resulting combustion of preheated methane and hydrogen off-gas raises the temperature of the furnace tubes to 1800° F. to 2500° F.

According to the present disclosure, an advantageous method for operation and control of an overall biomaterial charring sequence is thus provided. The disclosed method includes use of a furnace, such as the exemplary furnace described above. The disclosed method is effective in processing biomaterial and is self-regulating and self-terminating, wherein completion of the charring process is indicated by cessation of the production of biomaterial off-gas and a resultant reduction of hearth flame intensity and temperature. Thus, the disclosed method allows the hearth heat input to the furnace to self-extinguish. It is further noted that biochar properties for the end-products are deemed to possess optimum (or near-optimum) properties when processed according to the disclosed method. Alternate methods of furnace heating, such as electric heating, induction heating and hydrocarbon fuel heating, may be used, but will require alternate methods of control to avoid under-charring or over-charring of the biomaterial. These alternate heating techniques may also result in inferior char properties for the end-product due to varied heating time/temperature profiles of the biomaterial.

After the furnace-based processing of the biomaterial, the biochar must be allowed to cool to ambient temperature, usually overnight or for periods of 12 hours or more. In exemplary embodiments of the present disclosure, the overall required cooling time is a function of the heat loss of the furnace tubes, e.g., based on their design and relative positioning in the hearth. Newly formed Raw Biochar created in accordance with the present disclosure is a substantially pure carbon material containing a high degree of meso-, micro-, and nano-porosity and total surface area of 400 m² or more per gram. The newly formed hot biochar must not be exposed to open air so as to avoid auto-ignition or explosion. Furthermore, rapid complete exposure of cooled biochar to open air results in some oxidation and auto-temperature rise, thereby increasing the possibility of auto-ignition or explosion of the Raw Biochar. The Raw Biochar should be exposed to open air slowly while monitoring the surface temperature of the Raw Biochar using a non-contact pyrometer. The cooled and final exposed Raw Biochar may then be further processed into Prepared Biochar for final use in electronic components, such as ultra-capacitor electrodes or battery electrode support material and other applications replacing or substituting for the use of graphite, graphite-based compounds, graphene or graphene-oxide.

Pre-Shaping of Prepared Biomass for Subsequent Conversion and Charring into Net-Shaped Biochar Electrodes, e.g., for Use in Super-Capacitors and Ultra-Capacitors and Electric Battery Components.

The present disclosure also provides specific techniques/processes whereby the aforementioned Prepared Biomass may be advantageously utilized in downstream processes. For example, the Prepared Biomass may be pre-shaped into a shape resembling the desired ultra-capacitor electrodes to increase the efficacy of the part when used in a controlled and planned method of assembly. The Pre-Shaped Prepared Biomass thereby provides at least three (3) key and advantageous aspects/properties as compared to the current state of the art:

1) The Pre-Shaping eliminates certain manufacturing steps in the current technology, thereby leading to favorable manufacturing economics, improved margins, and lower cost to the end user.
2) The Pre-Shaping allows for the resulting ultra-capacitor electrodes to be a single homogeneous part (without packed particles otherwise containing inefficient void space in the matrix of those particles containing the pores and channels for ion and electron storage as is currently found in the existing art with graphite, graphene, and graphene-oxide exfoliated particles) and the Net-Shaping thereby side-steps the current technology of toxic compounds, their production or exfoliation and use.
3) The Pre-Shaping takes advantage of the controlled presence of the Biomass inputs of residual ions, compounds and elements in the controlled fabrication of the biochar electrode pores, channels, tubes, spaces, surfaces, cross-channeling and conductivity of those ions and added ions in the controllable end performance characteristics of the net-shaped biochar as an ultra-capacitor electrode.

The disclosed Ultra-Capacitor Application overcomes shortcomings associated with current super-capacitors and ultra-capacitors and the lack of economic incentive or justification for current super-capacitor use in the public or strategic domain due to cost, device performance, and other engineering factors. The present disclosure thus provides unique and novel applications driven by economic feasibility of these net-shaped biochar ultra-capacitors when such are manufactured in accordance with the techniques described herein. Of note, suitability of Net-Shaped Ultra-Capacitors made from Biochar can be tuned and tailored to the end-use applications to meet the performance requirements of energy density, power density, frequency response, electrical charge and discharge rates, number of charge cycles and other economic and engineering parameters mainly based on the key factors of raw biomass selection, handling, compounding, converting, pre-shaping, charring, net-shaping and treating, (not necessarily in that order.)

Prepared Biomass/Biomaterial Conversion to Raw Biochar and Subsequent Treatment into Prepared Biochar.

The present disclosure further provides advantageous techniques associated with the transformation of the Converted Biomass/Biomaterial into biochar by use of thermal and mechanical processing such that the end product of making the raw biochar that had been net-shaped into a pre-electrode state for further processing into prepared biochar is then ready for input as a component of an ultra-capacitor. Thus, the previously controlled state and inputs of the converted biomass/biomaterial that was then pre-shaped in prior steps is next heated by various means and under resulting atmosphere of its own off-gassing of vapor formed by heating, and under controlled atmospheres of liquid, gas or vacuum and is converted to biochar by such means. Furthermore, the use of the retort furnace for the charring process that converts the Prepared and Pre-Shaped Biomass into Raw Biochar removes or reacts inherent naturally occurring Organic Compounds such as Volatile Organic Compounds (VOCs) and tar compounds in the Prepared Biomass, simultaneously driving off these compounds into the vapor state or locking them into the Raw Biochar matrix as various solid phases of carbon structures.

The resulting Raw Biochar is characterized by controlled and managed physical, macro, meso, micro and nano-properties and chemical and electrical characteristics uniquely suited for its use as an ultra-capacitor electrode or for additional treatment by soaking, infusion, into a Prepared Biochar for final use, e.g., as an ultra-capacitor electrode. The "Time, Temperature, Pressure, and Environment" (the Prepared Biomass-generated volatiles created by the heating of the Prepared Biomass, or other introduced gas, liquid, vacuum of the charring furnace environment) is an important aspect in controlling the chemical transformations within the resulting biochar to control the end physical, chemical and electrical properties of the resultant net-shaped and prepared biochar for use as a component in ultra-capacitor electrodes.

After the Prepared Biochar is removed from the charring furnace, and as part of its final Net-Shaping, the Prepared Biochar can optionally be further treated by addition of surface coatings, surface polishing, surface etching, undergo bonding of electric collector plates, bonding or application of isolation separator plates, machining or cutting for addition of opening or "holes", or further infusion of polymers or monomers such as isoprene or poly-isoprene to then be polymerized within the pores to add softness within the Net-Shaped Prepared Biochar.

Net-Shaping of Biochar Electrodes, e.g., for Use in Super-Capacitors and Ultra-Capacitors.

The present disclosure also provides specific techniques/processes whereby the aforementioned Raw Biochar may be advantageously utilized in downstream processes. For example, the Raw Biochar may be net-shaped into ultra-capacitor electrodes to increase the efficacy of the part when used in a controlled and planned method of assembly. The Net-Shaped Biochar Electrode thereby provides at least three (3) key and advantageous aspects/properties as compared to the current state of the art:

1) The Net-Shaping eliminates certain manufacturing steps in the current technology, thereby leading to favorable manufacturing economics, improved margins, and lower cost to the end user.

2) The Net-Shaping allows for the ultra-capacitor electrodes to be a single homogeneous part (without packed particles otherwise containing inefficient void space in the matrix of those particles containing the pores and channels for ion and electron storage as is currently found in the existing art with graphite, graphene, and graphene-oxide exfoliated particles) and the Net-Shaping thereby side-steps the current technology of toxic compounds, their production or exfoliation and use.

3) The Net-Shaping takes advantage of the controlled presence of the Biomass inputs of residual ions, compounds and elements in the controlled fabrication of the biochar electrode pores, channels, tubes, spaces, surfaces, cross-channeling and conductivity of those ions and added ions in the controllable end performance characteristics of the net-shaped biochar as an ultra-capacitor electrode.

The disclosed Ultra-Capacitor Application overcomes shortcomings associated with current super-capacitors and ultra-capacitors and the lack of economic incentive or justification for current super-capacitor use in the public or strategic domain due to cost, device performance, and other engineering factors. The present disclosure thus provides unique and novel applications driven by economic feasibility of these net-shaped biochar ultra-capacitors when such are manufactured in accordance with the techniques described herein. Of note, suitability of Net-Shaped Ultra-Capacitors made from Biochar can be tuned and tailored to the end-use applications to meet the performance requirements of energy density, power density, frequency response, electrical charge and discharge rates, number of charge cycles and other economic and engineering parameters mainly based on the key factors of raw biomass selection, handling, compounding, converting, pre-shaping, charring, net-shaping and treating, (not necessarily in that order.)

Applications of Net-Shaped Biochar Electrode-Based Super-Capacitors and Ultra-Capacitors.

The further provides certain specific systems and techniques associated with the application of Ultra-Capacitors for use in electrical applications, e.g.:

1) Direct Current Electric Energy Storage of Solar, Hydroelectric, Wind, Regenerative or Excess Generated Power:

The ultra-capacitor can be added to solar panels for a complete energy package solution, store hydroelectric power that is asynchronously generated by tidal or gravitational flow to meet ad-hoc demand, hold regenerative power such as that which is generated by electric braking of electric vehicles or hybrid vehicles for return to the drive system of the vehicle when demanded or for use in the vehicle for other devices, or simply to store energy through planned power draw for surge or demand use later, such as recharging of an electrical vehicle or home or commercial lighting, appliance or equipment. One key aspect of the localized electrical energy storage using ultra-capacitors is the mitigation of load demand swings on the electric power generation, transmission and distribution system, and the offset of cable reinforcement needs by the utilities for new and concurrently deployed disruptive technology such and hybrid and electric vehicles.

2) Alternating Current Frequency Phase Angle Modification:

The typical Alternating Current power delivery system provides voltage sinusoidal potential to end devices, some of which do not accept the current flow proportional to, or in phase with, that voltage potential. This phenomenon is caused by the end powered device having inductance or capacitance of its own, and the resulting phase shift in the sinusoids of the power line voltage and power line current is measure as a phase angle difference and described or stated as such, or trigonometrically, the cosine of this phase angle difference, as a "Power Factor". Capacitors can be used to correct the power factor phenomenon as measured at the incoming line power but capacitors are costly, and bulky. They are typically implemented at the power utility company level on the distribution system, not by the end customer, nor are these power factor corrections typically located within the culprit end-user device. Ultra-capacitors can provide this electric capacitive feature as a cost-effective solution by implementing physically small and compact packaging for a high degree of capacitance directly in the end-user device. The end device being more "green" and "power grid friendly", without the need for correction at the utility tier, has significant economic impact and viability. Additionally, the power factor correction by the utility isolates the power factor error upstream of the correction point but is sensed by all local devices downstream, including the network of culprit devices. Correcting the power factor of the culprit device by using compact ultra-capacitors embedded in the device eliminates the power factor distortion to the upstream supply line and provides significant economic benefit from the application of ultra-capacitors.

3) Filtering of Non-Linear Loads on Alternating Current (A/C) Circuits:

It is a common application for electronics to use various methods of "chopping" only certain parts of an A/C line feed to utilize that part of the power wave to the end device's best advantage. Typical use of such "chopping" demand is the "switching power supply" of many electronic devices such as PCs, laptop computers, and battery chargers for most personal devices. A significant chopping and creation of harmonics is also caused by motor variable-frequency drives. The load imposed on the line supply by these devices creates a non-linear distortion unlike the phase angle shift of a power factor. Harmonic distortions are different. The current draw non-linearity can be completely in-phase with the voltage wave, but only draws current at certain points along the voltage wave crest and trough. This "notching" of the current draw puts specific stresses on the line supply and creates higher frequency harmonics in the current flow profile. Capacitors can be used to correct the current draw non-linearity harmonic phenomenon as detected by the incoming line power but capacitors are costly, and bulky. An end user with a high degree of current and resulting voltage harmonics are held to a specification by the providing utility to be less than a certain harmonic limit of Total Harmonic Distortion (THD). This limit correction and compensation is typically implemented by the end customer or within the culprit device and is done at a significant cost. Ultra-capacitors can provide this electric capacitive feature as a cost-effective solution by implementing physically small and compact packaging for a high degree of capacitance. The end device being more "green" and "power grid friendly", without the significant cost of the current state-of-the-art solution and has significant economic impact and viability. Additionally, the non-linearity and harmonic correction by the culprit end-user isolates the harmonic distortion to upstream users from the correction point.

Although the systems and methods of the present disclosure have been described with reference to exemplary embodiments and implementations, the present disclosure is not limited by or to such exemplary embodiments and/or implementations. Rather, the disclosed systems and methods are susceptible to modification, enhancement, refinement, variation and the like without departing from the spirit or scope of the presently claimed invention, as will be readily apparent to persons skilled in the art.

The invention claimed is:

1. A method for generating biochar material, comprising:
   a. selecting plant material for use in generating biochar based on predetermined criteria;
   b. mechanical conversion of the selected plant material;
   c. pre-shaping the mechanically converted plant material to a desired net-shape;
   d. charring the mechanically converted plant material in the desired net-shape in a furnace to generate biochar material; and
   e. fabricating at least one end-product from the net-shaped biochar material.

2. The method according to claim 1, wherein the plant material is selected at least in part based on at least one of plant species, soil characteristics and mineral content.

3. The method according to claim 1, further comprising processing steps related to selection of the plant material that include:
   a. harvesting of plants;
   b. washing of the harvested plants to remove soluble minerals therefrom.

4. The method according to claim 3, wherein the washing of the harvested plants includes at least one of allowing the harvested to lay fallow so as to be exposed to rain conditions, and manual washing of the harvested plants.

5. The method according to claim 1, wherein the mechanical conversion is undertaken in an extruder or pelletizer.

6. The method according to claim 1, wherein conditions associated with the mechanical conversion are sufficient to allow constituent components associated with the selected plant material to melt, reform and react to form the pre-shaped condition.

7. The method according to claim 1, wherein charring of the selected plant material is undertaken in a charring furnace that includes a heat source.

8. The method according to claim 7, wherein the heat source is selected from the group consisting of electrical heating, microwave heating, induction heating, hydrocarbon fuel heating, heating from furnace-resident biomaterial-generated off-gas, and combinations thereof.

9. The method according to claim 1, further comprising using the end-product as an ultra-high capacitor or a battery component.

* * * * *